United States Patent [19]
Gilbert

[11] Patent Number: 5,564,656
[45] Date of Patent: Oct. 15, 1996

[54] SEGMENTED SPOILERS

[76] Inventor: Raymond D. Gilbert, 6501 Inwood Dr., Springfield, Va. 22150

[21] Appl. No.: 297,578

[22] Filed: Aug. 29, 1994

[51] Int. Cl.$^6$ .................... B64C 3/58; B64C 5/10; B64C 9/00
[52] U.S. Cl. .................... 244/217; 244/213; 244/46; 244/90 B; 244/195
[58] Field of Search .................... 244/204, 206, 244/213, 217, 46, 90 A, 90 B, 195

[56] References Cited

U.S. PATENT DOCUMENTS

| | | |
|---|---|---|
| 2,410,855 | 11/1946 | Koppen . |
| 2,561,303 | 7/1951 | Whittle .................... 244/208 |
| 2,768,801 | 10/1956 | Bitner et al. .................... 244/90 A |
| 2,821,352 | 1/1958 | Phillips .................... 244/90 A |
| 3,554,086 | 1/1971 | Wills . |
| 3,618,878 | 11/1971 | Klein . |
| 4,270,712 | 6/1981 | von der Decken et al. .......... 244/90 A |
| 4,363,098 | 12/1982 | Buus et al. .................... 244/90 A |
| 4,391,424 | 7/1983 | Bartoe .................... 244/90 A |
| 4,591,113 | 5/1986 | Mabey . |
| 4,615,497 | 10/1986 | Seeler et al. .................... 244/75 A |
| 4,706,902 | 11/1987 | Destuynder .................... 244/76 C |
| 4,720,066 | 1/1988 | Renken et al. .................... 244/213 |
| 4,796,192 | 1/1989 | Lewis .................... 244/90 R |
| 4,964,599 | 10/1990 | Farineau .................... 244/195 |
| 5,209,438 | 5/1993 | Wygnanski .................... 244/204 |
| 5,445,346 | 8/1995 | Gilbert .................... 244/197 |

Primary Examiner—Andres Kashnikow
Assistant Examiner—Virna Lissi Mojica

[57] ABSTRACT

Segmented spoilers are parallel arrays of individually-extended barrier surfaces, such as rotatable eccentrically-mounted disks. The overlapping surface areas extend through a slot on a aircraft surface. When actuated, a segmented array generates a stiff, extendable, profiled spoiler-barrier. The individual surface areas are power-activated from below the airfoil surface according to motor commands from autopilots, operators, sensors and computers. Disk spoiler systems provide very rapid generation and retreat of controllable height barriers. The management of Bernoulli lift phenomenon with disk spoilers has unique use on an aircraft's nose, along the top of its wings, on the forward surfaces of horizontal and vertical stabilizers and within the intake sections of gas turbine aircraft engines. Disks are rotated by electric rotor-positioning motors and aircraft-powered axial force systems.

17 Claims, 5 Drawing Sheets 5,564,656

SEGMENTED SPOILERS

CROSS-REFERENCES TO RELATED APPLICATION

U.S. Pat. No. 5,445,346 Aircraft Tail Surface Spoilers and U.S. Pat. No. 5,458,304 Disk Spoiler System Ser. No. 08/302,275 Stress Damper, now abandoned, Ser. No. 08/296,668 Radial Force Spoiler Statement as to rights to invention made under federally-sponsored research and development: None

BACKGROUND OF THE INVENTION

A Stanford University author, I. M. Kroo reports that the quest for energy-efficient aircraft has renewed interest in canard configurations. These forward mounted airfoils, when used on rockets brings radially controllable forces to the front of an airframe (Ref: Journal of Aircraft Vol. 19 No. 9 1982 pp 792–793 and citation 155 of PB94-867116 of Dept. of Commerce NTIS.)

The Lockheed Electronics Company has developed an on-Board Structural Computer (OBSC) that monitors cyclic stresses on critical aircraft components. The system consists of an on-board processor that collects and processes data from strain gauges and from the aircraft's existing airspeed, altitude and vertical acceleration transducers (Ref: Citation 22 of PB94-8677116 NTIS)

The Information Services in Mechanical Engineering Database (ref: PB94-876851 of NTIS) cite 27 articles dealing with unwanted oscillation in aircraft from their selected technical journals, books and published proceedings. Unwanted oscillations contribute to excessive vibration, stress damage and fuel consumption.

Spoilers are little-mentioned in this selection of airfoil information from academic and research journals. However, lift-killing spoilers are used extensively to influence aircraft attitude and to manage flight energy.

Spoilers with manual adjustment are common control features for sport gliders (U.S. Pat. No. 2,410,855 Koppen). Power-actuated spoilers larger aircraft (U.S. Pat. No. 3,618,878) are also common. Hydraulically-actuated hinge-spoilers kill lift to quicken altitude descents without overspeed, and to shorten ground braking distance.

Spoilers provide easy access to energy in Bernoulli lift forces. Whenever airfoil shapes accelerate the air passing them, resistance incurred by the acceleration induces a force vector that is perpendicular (normal) to accelerated airflow. Spoiler action puts an airfoil barrier to acceleration. Ser. No. 07/935,284, now U.S. Pat. No. 5,495,396, uses spoilers to moderate and release fields of force that are perpendicular (normal) to observed airflow. e.g. Killing lift on one surface of a symmetrical airfoils releases normal force from the other surface.

A problem in full utilization of the force-releasing capability of spoilers is that they are too slow and too big. The usual mass, axis-of-rotation and actuating means for a spoiler's large surface area makes it actuating frequency too slow to be useful in damping Karman and other oscillations.

A related problem for quickly acting spoilers is an appropriate feedback sensing and data processing means to make a rapid spoiler useful.

A geometry problem in full utilization of Bernoulli lift effect of spoilers is that they are not curved. For instance, movement of the near-spherical nose section of subsonic aircraft invests instant energy in accelerating air particles over curved rings of expanding airfoil cross section. These balanced lift forces of Bernoulli physics are not presently used to augment flying-speed control of aircraft attitude or to minimize structural loads in aircraft.

SUMMARY OF THE INVENTION

A spoiler for airfoil surfaces is comprises of multiple, segmented carrier surfaces that extend through an airfoil slot to form a composite barrier having multiple height patterns.

The segmented barrier surfaces are individually positioned according to motor-drive timing and amplitude. Segmented surfaces include overlapping rotary disks and parallel sliding plates.

Spoiler segments are shaped to generate convex arcs for installation on an aircraft's nose surface, straight lines for cantilever airfoil surfaces, and concave arcs for the intake airfoil of jet engines. A data processor interprets autopilot and other sensor data into instructions for positioning-motors.

Small, fast-acting segmented spoiler elements are coupled with strain-gage data to reduce airframe oscillation. Nose-mounted arcs of spoilers augment elevator and rudder forces to reduce structural strain from bending moments to change attitude of a long narrow fuselage.

Figure 1:
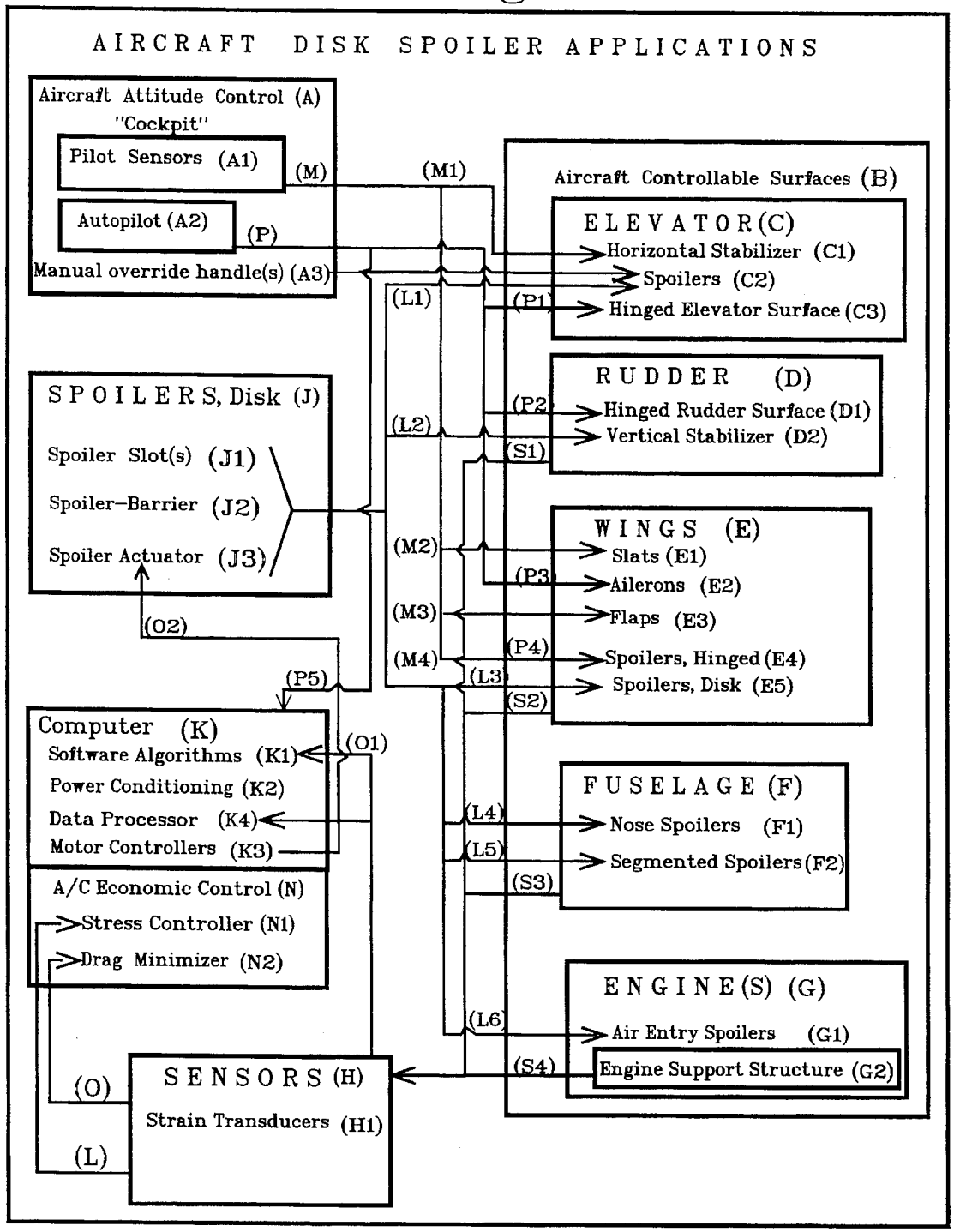
FIG. 1 is a chart of aircraft disk-spoiler applications.

A=Motor (FIG. 1-J3)

B=Power Input Conductors

C1=Barrier-Segment Surface, (FIG. 1-J2)

D=Shaft

E=Base, connecting motor to airframe

K3=Motor Controller

W=Airfoil Surface Spoiler Slot Aperture (FIG. 1-J1)

Y=Airfoil Surface

Figure 3:
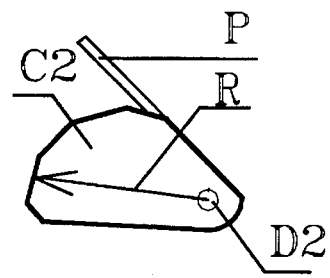

FIG. 3 is a surface profile of a disk.

P=Overlap Seal

C2=Rotatable plate surface

D2=Center of disk plate rotation

R=Radius of distance from shaft to edge of plate

S=Flat Edge-surfaces

Figure 4:
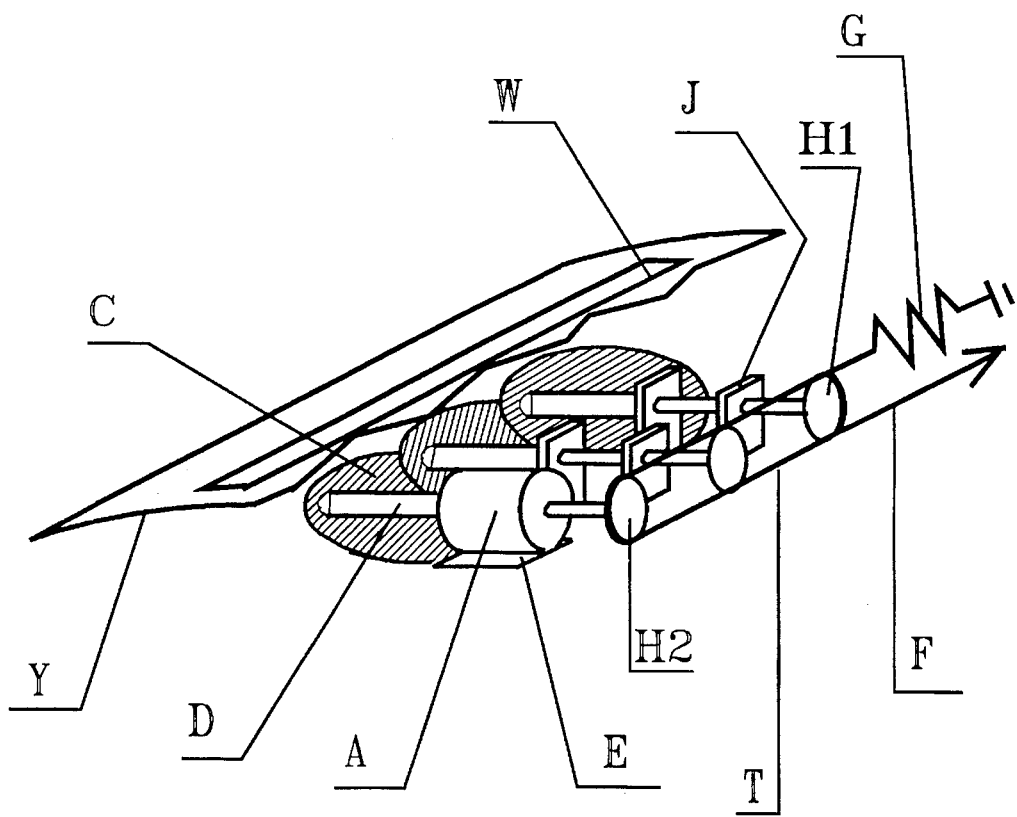

FIG. 4 is a disk spoiler array, with common mechanical drive.

D=Shaft, side

F=Tension Cable

H=Sprocket Rotators

J=Bearing

T=Tension Belts

G=Spring Bias

Figure 5:
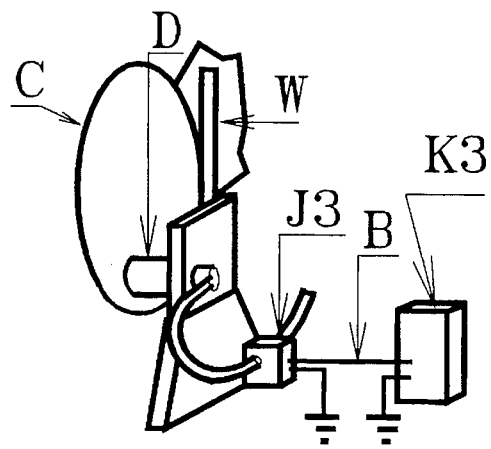

FIG. 5 is a linear motor with disk and relay.

Figure 6:
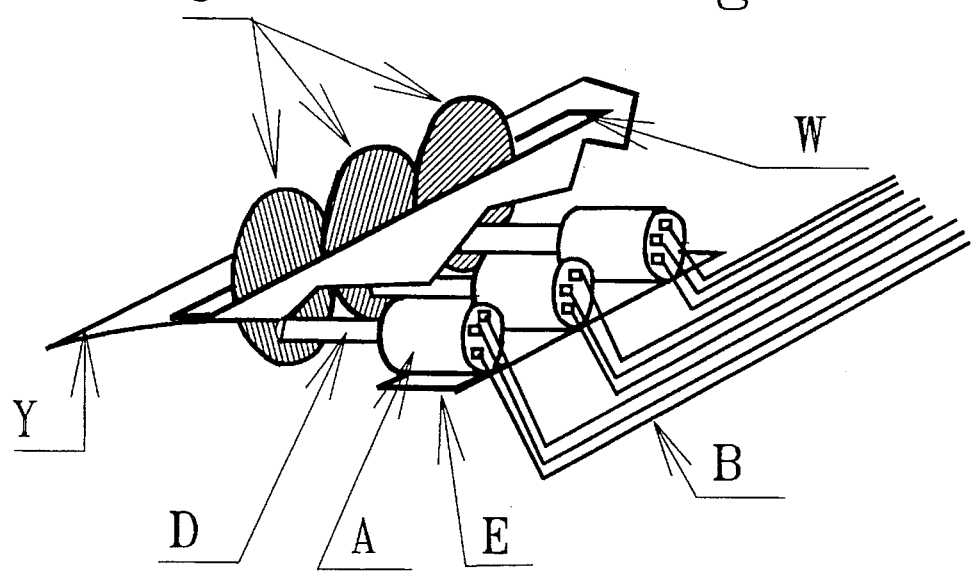

FIG. 6 is a straight array of extended disks with multiple electric positioning motors.

Figure 7:
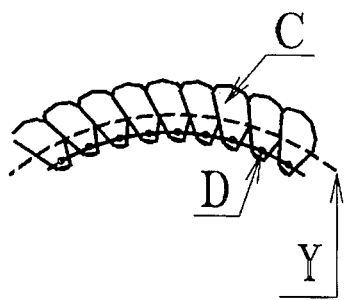

FIG. 7 is a convex array of disks.

Figure 8:
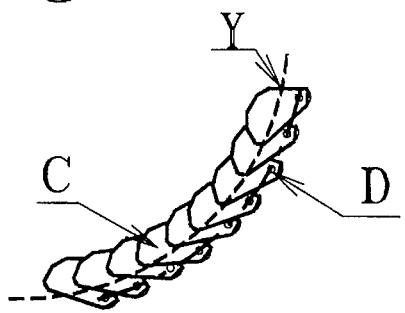

FIG. 8 is a concave array of disks.

Figure 9:
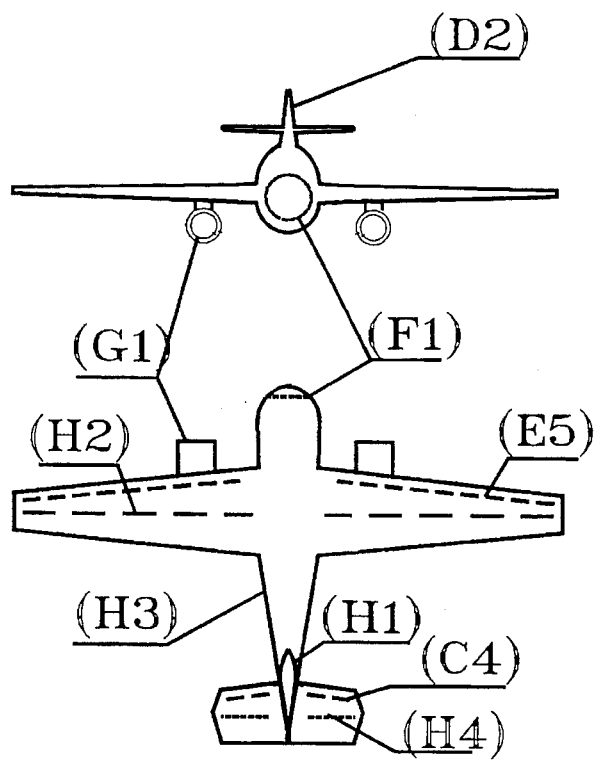

FIG. 9 is a front and plan view of an airplane with spoiler locations.

C4=Horizontal Stabilizer

D2=Vertical Stabilizer

E5=Segmented Spoilers on Forward Surface of Wings

F1=Arc Segment Spoilers (Convex)

G1=Arc Segment Spoilers (Concave)

H1=Strain Transducer on rudder {see FIG. 1-S1 circuit to 1-H}

H2=Strain Transducer on wings {see FIG. 1-S2 circuit to 1-H}

H3=Strain Transducers on fuselage {see FIG. 1-S3 circuit to

Figure 10:
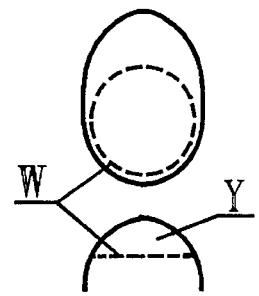

FIG. 10 is a front and plan view of an airplane nose surface with arc-slot {FIG. 7Y, 8Y, 13W, 17W} spoiler locations.

Figure 11:
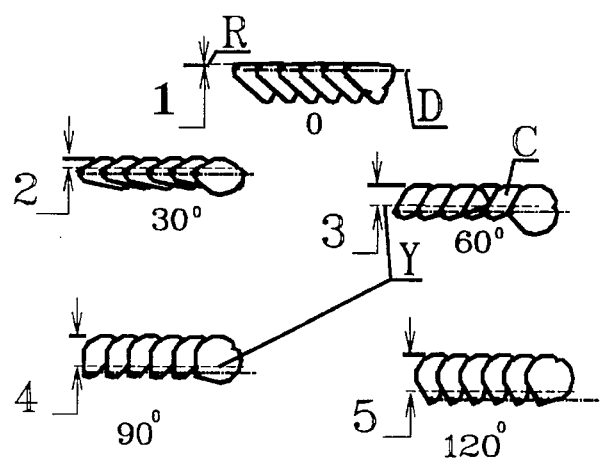

FIG. 11 is a disk array at 4 barrier heights in 30 degree steps.

1=No barrier above airfoil surface (Y)

2=Barrier height is overlap surface function at 30 degree rotation

3=Barrier height is overlap surface function at 60 degree rotation

4=Barrier height is overlap surface function at 90 degree rotation

5=Barrier height is overlap surface function at 120 degree rotation

Figure 12:
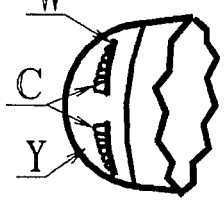

FIG. 12 is an application of a convex slot on an aircraft nose.

C=Spoiler-barrier surface

Figure 13:
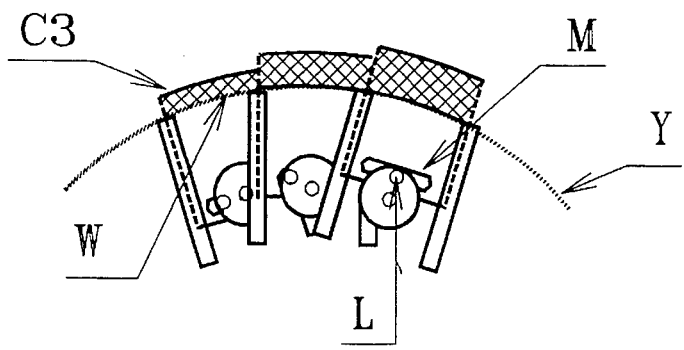

FIG. 13 is a profile of parallel sliding plate spoiler segments arranged to generate a convex barrier.

C3=Sliding plate

L=Eccentrically mounted shaft extension

M=Plate Slot

Figure 14:
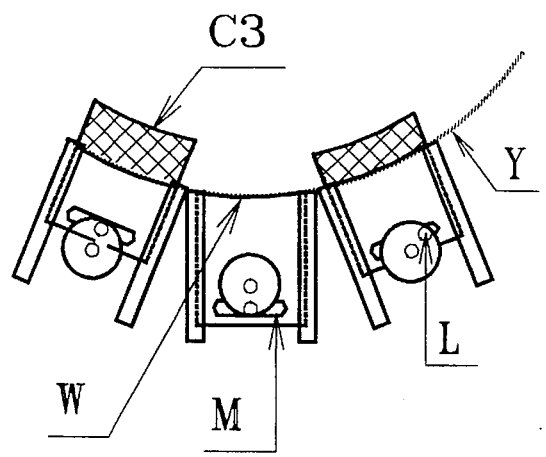

FIG. 14 is a profile of slider spoiler segments arranged to generate a concave barrier.

Figure 15:
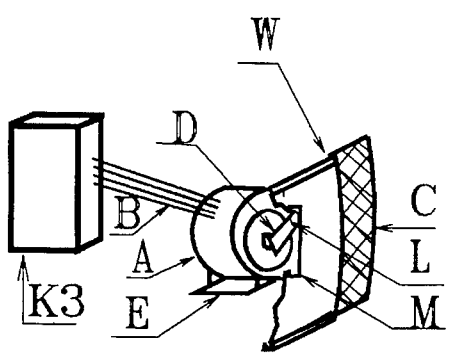

FIG. 15 is a slider assembly having a convex segmented surface.

Figure 16:
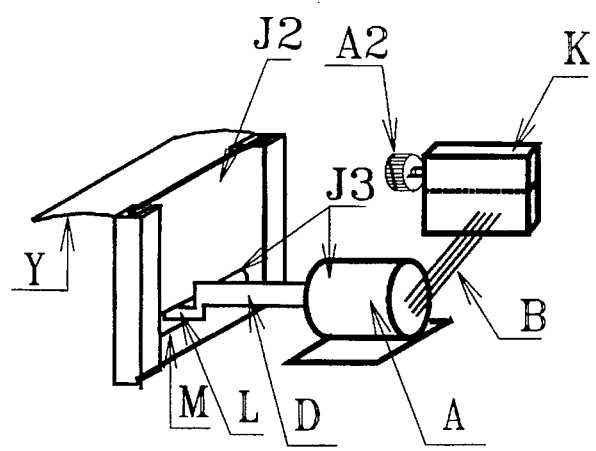

FIG. 16 is a sketch of a slot and slider with electric motor drive and motor controller.

K=Computer assembly

Figure 17:
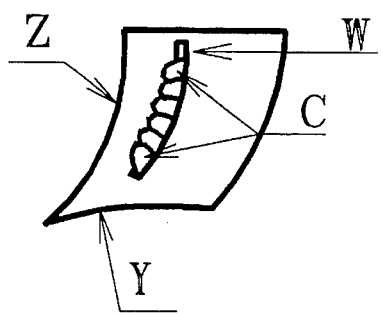

FIG. 17 is a set of spoiler segments in a concave airfoil.

Z=Engine intake airfoil

DESCRIPTION OF THE PREFERRED EMBODIMENTS

Segmented spoiler barrier surfaces (FIGS. 6C & 13C) extend through an airfoil slot (FIGS. 2W, 4W, 12W, 13W, 15W & 17W) to form a composite barrier having multiple height (FIG. 11-1, 2, 3, 4, 5) patterns. Segmented surfaces include overlapping rotatable disks (FIGS. 6C2, 7C2, 8C2) and parallel sliding plates (FIGS. 13C3, 14C3).

Figure 2:
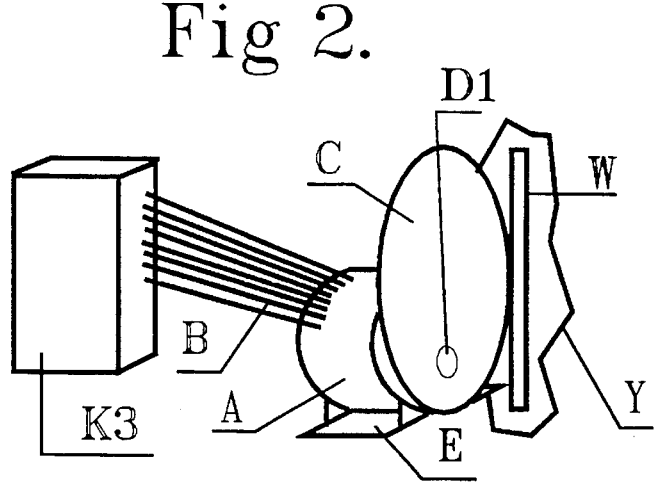
FIG. 2 is a sketch of a slot and disk with electric motor drive and motor controller.

Barrier-spoiler segments (FIG. 7) of a common surface slot aperture (FIG. 6W) are shaped to generate convex arcs (FIGS. 7C2 & 12C2). Their multiple installation on an aircraft's convex nose surface (FIG. 9F1, 10Y & 12Y) provides a ring-line of spoiler-arcs (FIG. 10C2).

Barrier-spoiler segments (FIG. 11-1) of a flat common surface slot aperture (FIGS. 4C & 6C) are installed in a straight line along the forward areas of cantilever airfoil surfaces (FIGS. 9E5 & 9C4).

Barrier-spoiler segments (FIG. 8) within a common surface slot aperture are shaped to generate concave arcs (FIG. 8C2 & 17C2). A line of these arcs generate a concave ring-line of spoiler-arcs for the intake airfoil of jet engines (FIG. 9G1 & 17Z).

Parallel sliding plates (FIGS. 13C3, 14C3, 15C3 & 16J2) are arranged within individual surface-slots and bearings to match straight, convex and concave airfoils.

A data processor (FIG. 1-K4) connects to the autopilot (FIGS. 1-(A2) & 16A2) and to strain transducers (FIG. 1-(H)). A feedback circuit communicates sensed data into instructions that pass through circuits to motor-controllers (FIGS. 1-(K3), 2K3, 5K3 & 15K3).

Individual disks of an arc spoiler barrier (FIG. 1-(J2)) pass through a spoiler arc-slot (FIG. 1-(J1)) as they are rotated by spoiler actuators (FIG. 1-(J3)) electrically connected to motor controllers. Nose-mounted arcs of spoilers (FIG. 7, 10, 12) react through actuators (FIG. 1-(J3)), driven by motor controllers (FIG. 1-(K3)), whose power conditioning means (FIG. 1-(K2)) interprets feedback signals (FIG. 1-(01)) from strain transducers (FIG. 1-(H1)) located (FIG. 1-(S3)) on the fuselage (FIG. 1-(F)).

Actuation of spoiler barriers, within a multiple arc-slot (FIG. 10C), along a ring array at the aircraft nose, selectively kills a portion of balanced radial Bernoulli-effect forces to augment elevator and rudder forces, and reduce structural stress forces from bending moments of a long narrow fuselage.

Thus, input signals from fuselage-mounted strain-transducers (FIG. 1(H1) & 9H3), connect to circuits which actuate segments of the nose-mounted barrier arcs (FIG. 1(J1)). Computer apparatus (FIG. 1(K)), also in the circuit, drives the spoilers to reduce structural strain from unexpected turbulence.

Details of Preferred Embodiment

A plate with flat surface, e.g. "disk", (FIGS. 2C1, 5C1) is a segment of barrier surface (FIG. 3C2) whose center of rotation (FIG. 3D2) is eccentric: near one end of the segment's face surface (FIG. 3C2); whose edges are at an increasing radius (FIG. 3R) from the shaft center (FIG. 3D2); and is attached at right angles to a first end of a shaft (FIGS. 2D, 4D, 5D & 6D).

The shaft (FIG. 4D) is oriented by rotary bearings (FIG. 4J), attached to a host airframe, to be a motion transmitting axis of rotation which is parallel (FIG. 6D vs 6Y) to an airfoil (FIGS. 2Y, 4Y, 6Y, 12Y, 13Y, 14Y, 16Y & 17Y) and approximately parallel to in-flight airflow.

A slot aperture (FIGS. 1-(J1), 2W, & 4W) is formed through the airfoil surface (FIG. 4Y) and is approximately perpendicular (FIG. 9E5) to airstream direction. Airframe structure (FIGS. 1-(E) & 1-(F)) hold motors and bearings (FIGS. 2E & 4E) beside airfoil surfaces (FIGS. 2Y & 4Y) and in alignment with the path of shaft-mounted disks (FIGS. 4C1 & 6C1).

Multiple, overlapping, stiff-plate disks (FIGS. 4C, 6C, 7C, 8C, 11C, 12C, & 17C) rotate through a common slots to generate a composite spoiler-barrier (FIG. 1-(J2)) within a single slot (FIG. 4W, 6W, 12W & 17W), having multiple heights (FIG. 11: 1–5), dependent upon each disk's (FIG. 2 & 6) angular rotation.

An overlap seal (FIG. 3P) extends to make-smooth the top surface of the slot aperture at zero rotation. A segment of the disk's edge provides an ever-increasing radius (FIG. 3R) of a series of flat edge surfaces (FIG. 3S) which generate a near-flat barrier top at selected angles of eccentrically-centered barrier segment disk rotation.

Multiple, overlapping, stiff-plates rotate through a plurality of common slots to generate a barrier array (FIGS. 9E5, 9F1 & 9C1), each barrier segment having multiple heights, dependent upon the disk-plate's angular rotation (FIG. 11: 1–5).

Power means (FIG. 1-(J3) to actuate individual disk spoilers include individual electric motors (FIGS. 2A, 5A, 6A, 15A & 16A), electric motors driving multiple disks (FIGS. 4A), aircraft system cables (FIG. 4F) and cables (4F) to overriding manual handles.

Positioning motors (FIG. 4A) connect to multiple disk shafts through synchronizing means such as sprocket rotators (FIG. 4H) with non-slip tension-belts (FIG. 4T).

Spoiler actuators (FIG. 1-(J3)) communicate angular motion to swing disks (FIG. 2C, 3C & 4C) from their hidden position (FIG. 11-1Y) below a slot surface (FIGS. 7Y & 8Y) into a multi-disk barrier (FIG. 6C). Angular rotation determines height levels (FIGS. 11-2 through 11-5).

Data-processors (FIG. 1-(K3), 2K3, 5K3, 15K3 & 16K3) and motor controllers comprise circuits for communication of powered instructions (FIGS. 2B & 5B) to a positioning motor (FIGS. 2A & 15A).

Electric stepper motors (FIGS. 2A & 6A) use controllers (FIGS. 1-(K3) & 2-(K3)) to condition the phase angle of power sent to the motors. Their tight control over sustained patterns of barrier height recommends them.

The simple "bang-bang" minimum-weight, single-lead pulser DC motors (FIG. 5J3) are spring biased (FIG. 5G) with power-timing and duration as the height-controlling parameter.

Aircraft motor-driven positioning cables offer a mechanical override power means (FIG. 4F) for synchronizing movement of segmented lines of wing surface spoilers (FIG. 9E5) with ailerons. Similarly, aircraft control communication (FIGS. 1-(A1) & 1-(A1) & 1-(A2)) with tail surfaces (FIGS. 1-(C3) & 1-(D1)) offers a source of actuation instruction to nose spoilers (FIG. 1-(F1)).

Rotational instruction for electronic-driven spoiler-actuators (FIG. 1-(J3)) are processed by computer (FIG. 1-(K)) with software algorithms (FIG. 1-(K)1) and amplified through output communication means (FIG. 1-(K2)).

Control of aircraft attitude characteristically is communicated through autopilot circuits (FIG. 1-(A2)) to actuate powered control systems (FIGS. 1-(C), 1-(D) & 1-(E)). A communication channel (FIG. 1-(P4)) links the autopilot with a spoiler-controlling computer (FIG. 1-(K)).

Individual disks (FIG. 2C), rotated in a contiguous group comprise a barrier (FIG. 1J2) perpendicular to its airfoil surface of a common slot aperture, with individually controllable height patterns. A line of slot apertures along the forward surfaces of cantilever airfoils (FIG. 9E5) (FIG. 1-(J1)), such as wings (FIG. 1-(E)) and elevators (FIG. 1-(C)), is a stress-relieving apparatus when feedback from sensors passes through data-processors to computer-managed actuating motors.

Strain sensors (FIG. 1-(H1)), permanently affixed to aircraft structures and surfaces provide strain data (FIG. 1-(L1)) through a connecting circuit to data processors (FIG. 1-(K4)). The data processors connect (FIG. 1-(S2)) with power conditioners, structural stress control (FIG. 1-N1)) modules and spoiler actuators (FIG. 1-J3)) in a feedback circuit. These feedback circuits define instant positions of spoiler segments (FIG. 1-(J2), 2B, 4A & 5A) and contribute to their fast-reaction.

The strain transducers (FIG. 1-(H1)) are installed on the cantilevered airfoil surfaces of wing and elevator, in a line near the center of the surfaces (FIG. 9H2). Resulting strain data describes wing-structure oscillation. Circuit connections (FIG. 1-S2)) link structural stress control modules (FIG. 1-(N1)) with data processors (FIG. 1-(IK4)) and communicate conditioned power through motor controllers (FIG. 1-(K3)) to selected spoiler segment actuators (FIG. 1-(J3)).

Computer data processors (FIG. 1-(K4)) direct amplitude of individual spoiler actuators (FIG. 1-(J3)), using software algorithms (FIG. 1-(K1)) with combined inputs from autopilot (FIG. 1-(A2)), other pilot sensors (FIG. 1-(A1)) and strain transducers.

Bernoulli-force reaction from the small, fast-acting spoiler segments (FIGS. 2C1, 3C2, 13C3), when coupled with feedback data from strain-transducers (FIGS. 1-(H) & 9H3), reduces or kills structural strain from unnecessary oscillating, bending moments of aircraft cantilever airfoil structures e.g. wings (FIG. 1-(E)), elevators (FIG. 1-(C)), and rudder (FIG. 1-(D)).

Wing-emplaced strain-transducers (FIG. 1(H1) & 9H2), plus feedback circuits (FIG. 1-(S2)) communicate strain data to a position data processor (FIG. 1-(K4)) and motor controllers for individual spoiler segment actuators (FIG. 1-(J3)) within a line of wing spoilers (FIG. 9-E5).

(Fast reacting spoiler motion, based on computer interpretation of strain patterns, will extend airframe life.)

As sensors (FIG. 1H) report strains of flight operations and strains from Karman oscillations, rapid-reacting spoiler segments temporarily interrupt laminar flow patterns on one surface of the aircraft to release pressure induced by Bernoulli effect on a mirror image part of the symmetrically-designed aircraft. The disk spoiler provides an indirect means of applying short bursts of force, normal to the path of a flying aircraft and its structural components.

New locations for spoilers include placement of convex slots onto aircraft nose surfaces (FIGS. 11(F1), 9F1 & 12Y) as a means to timely reduce forces that flex a fuselage in both operation and oscillation modes. On-board computers (FIG. 1-(K)) instruct nose-spoiler actuators (FIG. 1-(J3)), based on instant data received from strain-gage transducers (FIG. 1-(H)), permanently installed on the fuselage (FIG. 9H3); and also based on autopilot (FIG. 1-(A2)) attitude control signals, combined to minimize structural stresses of the immediate future.

Conventional wing-mounted airfoil locations for spoilers (FIG. 1-(E3) and 1-(E4)) are modified by placing them on the forward airfoil surfaces (FIGS. 9E5 & 9C1) to permit segmented spoiler forces to damp wing oscillating patterns, based on feedback from strain transducers (FIG. 1-(H1), 1-(E)/S2 & 9H2).

An additional disk spoiler application is its location, in groups within the jets engine's intake duct (FIG. 1-(G1) & 17Y). This unusual spoiler location permit normal Bernoulli forces from surfaces opposite an extended disk or plate segmented spoiler to be released in response to anticipated change in aircraft attitude, and in response to force-oscillations that are generated in structures whose materials are elastic.

Very old approaches to aircraft attitude control extend tension members to force-generating surfaces at the ends of an airframe. Thus, a tension cable (FIG. 4F) and reverse spring bias (FIG. 4G), connect with non-slip tension-belts (FIG. 4T) to communicate with cockpit control (FIG. A3) means for manual and other mechanical actuation of spoilers on wing and tail surfaces.

I claim:

1. In combination with an aircraft comprising airfoil surfaces on its fuselage, wings, elevator, rudder and engines, and further comprising power systems, sensor systems and an automatic pilot;

a segmented barrier-spoiler disk means comprising:
multiple, rotatable overlapping barrier-surface segments, further comprising;

overlapping plate surfaces, shaft, and rotary bearings;

a slot-aperture, further comprising common-slot bearing means, multiple spoiler-actuator means, further comprising, positioning motor motion-transmitting means and motor-position controllers further comprising a power conditioning means, further comprising data processors and feedback circuits to motor position controllers;

wherein each barrier surface segment is mounted eccentrically near one end of its face, to a first end and at right angle to the shaft; and wherein disk shafts are parallel and axially oriented to rotate disks in independently parallel paths so as to share a common slot aperture; and wherein the common-slot bearing means guides the disk to pass through the slot aperture, at right angles to the airfoil surface, as moved by the motion-transmitting means; and wherein the surfaces of multiple disks overlap with other disks; and wherein the spoiler-actuator motors connect through a motion transmitting means to the disk and the shaft and rotary bearing combine to be disk's rotary motion transmitting means; and wherein the rotary bearings are located beside the airfoil surface area surrounding the slot-aperture slot; and the bearings are connected to the airfoil surfaces to hold the shaft's axis of rotation approximately parallel with in-flight airflow; and wherein the positioning motors are connected to motor-positioning circuits, further comprising a motor controller and power conditioning means; and wherein torque of the positioning-motor shaft proves rotational force to move its disk surfaces through the slotted airfoil; and wherein a feedback circuit communicates through a data processor to motor controllers; and wherein the power conditioning means combines data from the data-processor with power from the aircraft electric system to drive the motor controller;

whereby multiple disks generate a composite spoiler-barrier surface, normal to inflight air flow and at right angles to the airfoil surface and whose array height is a function of each disk's motor-shaft's angle of rotation.

2. Apparatus of claim 1, further comprising:

strain transducers, and circuit connections (to strain transducers on aircraft structural surfaces);

wherein the strain-transducers are mounted on aircraft surface structures; and wherein strain-transducers sense and communicate feedback data that measures structural stress;

whereby motor-driven disk spoiler heights are generated by motor shaft rotation in response to strain data, and resultant fast spoiler actuation changes local, immediate influence of Bernoulli force to reduce stress in aircraft structures.

3. Apparatus of claim 1, wherein power conditioning means further comprises:

a computer with memory, software algorithms circuit connections to autopilot;

wherein autopilot data-commands pass through circuit connections to data processors which drive motor controllers and alter the motor shaft positions and the extended height of connected spoiler-segments; and wherein location of segmented spoilers on front portion of wing near-end surfaces augments the aircraft's aileron-roll capability; and whereby the segment heights are altered in response to autopilot commands for intentionally changing aircraft attitude;

whereby motor-driven spoiler disk heights are generated by motor shaft rotation from autopilot command.

4. Apparatus of claim 2 further comprising:

a computer, further comprising:

memory, loaded with software algorithms, further comprising, structural stress control and drag minimizer;

wherein the computer is connected electronically with strain-transducers that are mechanically connected to the aircraft structure, and circuits of the structural stress control further process transducer feedback from cyclic stresses and unwanted oscillations; and wherein the data processors of the computer define motor-positions whose attached rotationally positioned spoiler segments will selectively kill a portion of instant local lift force with a resultant force profile that reduce stress in aircraft structures.

5. Apparatus of claim 1 wherein the barrier surface segment is further comprised of a stiff plate, further comprising:

a shaft connection on a face surface, near one end and a span of multiple edge points of continuously increasing radius from the shaft, wherein the shaft mounting near one end of the plate face turns the disk eccentricity.

6. Apparatus of claim 1 wherein location of the slot apertures on aircraft airfoil surfaces comprise:

a ring-line of arcs on convex surfaces;

wherein multiple arc-slots comprise a segmented ring of spoilers whose individual disks are actuated in response to autopilot command.

7. Apparatus of claim 2 further comprising:

a ring-line of arcs on convex surface;

wherein the barrier-spoiler extended from arc slots is responsive to feedback from fuselage strain transducers.

8. Apparatus of claim 2 wherein location of the slot apertures on aircraft airfoil surfaces comprise:

a ring-line of arcs on concave airfoil surfaces;

wherein multiple arc-slots comprise a segmented ring of spoilers whose individual disks are actuated in response to autopilot command and from sensors mounted on engine-mount and wing structures.

9. Apparatus of claim 1, wherein the slot apertures are located as components of a line of spoilers (FIG. 1E5) on forward surfaces of cantilever airfoils (FIG. 8E5);

wherein strain data (FIG. 1H2) from other aircraft systems and autopilot data are combined to actuate selected spoiler segments of a cantilever structure, and wherein strain data from other aircraft systems is converted by computers to identify selected spoiler segments located in a line along a cantilever structure, that would kill a portion of structural oscillation; and wherein data processor means directs actuation of the spoiler.

10. Apparatus of claim 1, further comprising:

aircraft airfoil control-surface motors airfoil control surfaces of fuselage, wings, elevator and rudder common rotational driving means wherein common rotational means communicates angular rotation to segments; and wherein force applied from outside the motion transmission means rotates the segments; and wherein the rotational forces actuate multiple spoiler surfaces to pass though the slot aperture.

11. Apparatus of claim 6 further comprising:
strain transducers on fuselage structure;
wherein the barrier-spoiler extended from arc slots is responsive to feedback from fuselage strain transducers;
whereby deployment of programmed segmented spoilers kills radial forces induced by Bernoulli effect, and reduces structural stress of fuselage.

12. Apparatus of claim 1, wherein the slot apertures are located on forward airfoil surfaces of cantilever airfoils (FIG. 8E5) as straight segments of a line of spoilers (FIG. 1E5);
wherein strain data (FIG. 1H2) from other aircraft systems and autopilot data are combined to actuate selected spoiler segments of a cantilever structure; and
wherein strain data from other aircraft systems is converted by computers to identify selected spoiler segments located in a line along a cantilever structure, that would kill a portion of structural oscillation; and
wherein data processor means directs actuation of the spoiler.

13. Apparatus of claim 1 wherein motion transmission means further comprises:

a first sprocket (4H1), attached to a second end of a shaft to drive the rotatable barrier-surface segments, a second sprocket (4H2), attached to the positioning motor, a non-slot belt (4T);

a tension means (FIG. 4F), and a spring-bias means (FIG. 4G);

wherein the first and second sprocket are aligned to be connected with a nonslip belt and the belt communicates angular rotation of motor-driven sprocket to a spoiler-actuator sprocket; and
wherein an end of the tension means is connected to a first socket-to-socket span of the belt, and a spring bias means is connected to a portion of the belt as a means to oppose the force of the tension means; and
wherein force applied through tension means from outside the motion transmission means draws belt movement to rotate the sprockets in a first rotational direction; and
wherein upon release of the applied force, the spring bias means applies opposite force to rotate the sprockets in a second rotational direction; and
wherein the sprocket, belt and tension items are combined to actuate multiple spoiler surfaces to pass though the slot aperture; and
whereby more than one positioning motor, serving a common slot aperture, connects to and rotates more than one of the multiple segments.

14. In combination with an aircraft comprising airfoil surfaces on its fuselage, wings, elevator, rudder and engines, and further comprising power systems, sensor systems and an automatic pilot;

a segmented barrier-spoiler means comprising:
a segmented barrier plate spoiler (FIG. 11-J3) means further comprising:
a flat surface, parallel sides and
a flattened orifice near the plate's base, and
a side-bearing means further comprising;
a plate left side sliding bearing and
a plate right side sliding bearing and
a plate-actuating bearing further comprising
a plate-slot and
a motor-driven slider;
positioning motor means
a motion-transmitting means and
motor-position controllers further comprising
a power conditioning means;
wherein the plate fits into on side bearings for its left and right side; and
wherein the plate passes through an aperture slot, providing bearing surfaces to its face and back; and
wherein the plate-slot slidingly connects to a motion-transmitting means, and
wherein the side bearings connect to the structure surrounding the aperture slot and extend at right angles to the airfoil and into the aircraft; and
wherein the barrier surface segment means is a "sliding plate"; and
wherein the slot bearing means guides the plate to pass through the slot aperture, at right angles, as moved by the motion-transmitting means; and
wherein multiple to be deployed as a composite spoiler-barrier surface, normal to inflight air flow and at right angles to the airfoil surface; and
wherein the spoiler-actuator motors connect through a motion transmitting means to the sliding plate; and
wherein the plate bearings are connected to the airfoil surfaces; and
wherein the positioning motors are connected to motor-positioning circuits, further comprising a motor controller and power conditioning means; and
wherein multiple plates are arranged in lines, normal to in-flight airflow, and become segmented spoilers; and
wherein slide bearings that extend sidewardly beyond extended plates are jogged to present a line of extended plates normal to the airflow; and
whereby multiple plates generate a composite spoiler-barrier surface, normal to inflight air flow and at right angles to the airfoil surface and whose array profile height is a function of each disk's motor-shaft's rotation.

15. In combination with an aircraft comprising airfoil surfaces on its fuselage, wings, elevator, rudder and engines, and further comprising power systems, sensor systems and an automatic pilot; and
on a forward surface of an airfoil, a line of slotted, perpendicular-barrier spoiler means comprising:

a line of forward-located slot aperture assemblies, further comprising;
the airfoil surface with a slot-aperture multiple perpendicular barrier surface segments,
spoiler actuator means, further comprising;
multiple motion-transmitting means, further comprising
structurally-attached bearing means,
multiple positioning motors,
motor-position controllers and
power conditioning means;
wherein each barrier surface segment is guided through the slot aperture, as moved by the motion-transmitting means; and
wherein bearing-oriented rotational segments are spaced to overlap one another; and
wherein the motors are connected to motion transmission apparatus, connected at right angle to the barrier surface segments; and
wherein each motor's rotation adjusts the vertical height of the perpendicular barrier spoiler surface as a function of rotation angle and shape of the barrier segment spoiler actuator means (FIG. 3); and wherein the motion-transmitting means are attached to the aircraft's airfoil structure, and connect spoiler-actuator motors to the barrier surface segments; and wherein the motor-positioning controller is connected electrically to the positioning motor and to the power conditioning means;

whereby multiple motor and multiple barrier segments deploy a unique array profile of barrier height at right angles to airflow over the forward airfoil surface.

16. Apparatus of claim 15, further comprising:

individual motors and motion transmitting means;

wherein motion transmitting means communicates common rotary motion from a motor to multiple segments.

17. Apparatus of claim 15, further comprising:

strain transducers on aircraft structural surface, a data processor means, wherein strain-transducer data is fed through a feedback circuit to motor controllers;

whereby motor-driven spoiler heights are altered in response to feedback of strain data, and resultant fast spoiler actuation changes local influence of Bernoulli force to reduce stress in aircraft structures.

* * * * *